United States Patent Office 3,052,733
Patented Sept. 4, 1962

3,052,733
METHOD OF ALKYLATING BETA-HALOETHYLBENZENES
George A. Olah, Stephen J. Kuhn, and Harold W. Quinn, all of Sarnia, Ontario, Canada, assignors to The Dow Chemical Company, Midland, Mich., a corporation of Delaware
No Drawing. Filed June 6, 1960, Ser. No. 33,923
10 Claims. (Cl. 260—651)

This invention concerns a method and catalyst for alkylating beta-haloethylbenzenes having at least one replaceable hydrogen atom on a carbon atom of the aromatic nucleus with olefins to produce a corresponding beta-haloethyl alkylated derivative. It relates more particularly to a method for alkylating beta-haloethylbenzene with aliphatic olefins to produce a corresponding beta-haloethyl alkyl benzene.

It is known to alkylate aromatic compounds by reaction of an olefin such as ethylene, propylene, butylene and the like with an aromatic compound such as benzene, toluene, chlorobenzene, etc., in the presence of a Friedel-Crafts catalyst.

It is known to prepare 1,3,5-ethylxylene by reaction of ethylbenzene and meta-xylene in the presence of hydrogen fluoride and titanium tetrafluoride as catalyst.

It is disadvantageous to alkylate haloalkyl aromatic compounds in the presence of a Friedel-Crafts catalyst, such as aluminum chloride, since the catalyst tends to interact with the haloalkyl group in the aromatic compound and results in low yields of product or undesired by-products.

It has now been discovered that haloalkyl aromatic compounds having at least one replaceable hydrogen atom on a carbon atom of the aromatic nucleus, and more particularly, beta-haloethylbenzenes, can readily be alkylated to produce a corresponding haloalkyl alkylated aromatic compound in good yield by reacting an olefin with the haloalkyl aromatic compound in the presence of a small but effective proportion, e.g. from 1 to 20 percent by weight, based on the weight of the beta-haloethylbenzene initially used of a Friedel-Crafts type catalyst comprising a mixture of hydrogen fluoride and titanium tetrafluoride in proportions corresponding to at least 0.5 gram molecular proportion or more of the hydrogen fluoride per gram molecular proportion of the titanium tetrafluoride.

It has further been found that a mixture of hydrogen fluoride and titanium tetrafluoride in proportions of at least 0.5 gram mole, preferably from 1 to 10 moles, of the hydrogen fluoride per gram mole of the titanium tetrafluoride, is a most effective catalyst for alkylating beta-haloethylbenzenes with olefins to produce a corresponding beta-haloethyl alkylbenzene.

It has been found that alkylation of the aromatic nucleus of beta-haloethyl aromatic compounds with olefins can readily, rapidly and efficiently be carried out in the presence of a catalyst comprising hydrogen fluoride and titanium tetrafluoride with little, if any, reaction of the side chain halogen atom to form decomposition products or undesired by-products, and at atmospheric or substantially atmospheric pressure.

Broadly, the present invention comprises alkylating a haloalkyl aromatic compound with an olefin while in contact with a catalyst comprising anhydrous or substantially anhydrous hydrogen fluoride and titanium tetrafluoride or a complex of the hydrogen fluoride, titanium tetrafluoride and the haloalkyl aromatic compound starting material.

More specifically, the invention comprises alkylating a beta-haloethylbenzene with an olefin, preferably a mono-ethylenically unsaturated aliphatic olefin containing from 2 to 12 carbon atoms in the molecule, in the presence of, or in contact with, a catalyst comprising hydrogen fluoride and titanium tetrafluoride as hereinbefore stated.

The haloalkyl aromatic compounds to be alkylated can be any haloalkyl aromatic compound having at least one replaceable hydrogen atom on a carbon atom in the aromatic nucleus and a halogen atom in the beta position in the alkyl side chain, such as beta-chloroethylnaphthalene, beta-bromoethyldiphenyl, beta-bromoethylxylene, beta-chloroethylethylbenzene, beta-chloroethylbenzene, beta-bromoethylbenzene, beta-chloroethyltoluene, beta-bromoethyltoluene, beta-bromoethylxylene, beta-chloroethylxylene, beta-fluoroethylbenzene, beta-fluoroethyltoluene, beta-fluoroethylxylene, beta-iodoethylbenzene or beta-fluoroethyl ethylbenzene. It may be mentioned that alkylation of the iodine-containing compounds, e.g. beta-iodoethylbenzene, results in somewhat lower yields of the corresponding beta-iodoethyl alkylbenzene because of the greater tendency of the iodine-containing compounds and the alkylated derivatives to decompose, and for this reason the invention is advantageously employed in the alkylation of the bromo-, chloro-, and fluoroalkylaromatic compounds, preferably the beta-chloroethyl-, beta-bromoethyl-, and beta-fluoroethylaromatic compounds of the benzene series, i.e. containing six carbon atoms in the aromatic nucleus.

The olefins to be employed in the alkylating reaction can be any monoethylenically unsaturated olefin containing a double bond between vicinal carbon atoms in an aliphatic chain. Examples of suitable olefins are styrene, vinyltoluene, vinylxylene, isopropyl styrene, ethylvinylbenzene, alpha-methylstyrene, alpha-ethylstyrene, and aliphatic hydrocarbons such as ethylene, propylene, isobutylene, butene-1, butene-2, isopentene, pentene-1, hexene-1, isohexene, heptene, octene-1, 2-ethylbutene-1, nonene, decene, undecene and dodecene and the like. The aliphatic olefins containing from 2 to 12 carbon atoms are preferred.

The invention is described more particularly hereinafter with reference to the alkylation of beta-haloethylbenzenes with aliphatic olefins, it being understood that the alkylation of the halo-alkyl aromatic compounds with olefins as hereinbefore described is equally applicable in the practice of the invention.

The proportions of the olefin and the beta-haloalkyl aromatic compound can be varied over wide limits, but is generally within the range of from about 0.25 to 1.5 gram molecular proportions of the olefin per gram mole of the beta-haloalkyl aromatic starting material in order to obtain products which consist predominantly of the mono-substituted alkylation product, although greater proportions of the olefin can be used.

It is important that the catalyst contain the hydrogen fluoride in proportions corresponding to at least 0.5, preferably from 5 to 20, gram molecular proportions of the hydrogen fluoride per gram molecular proportion of the titanium tetrafluoride therein. The catalyst can be employed in amounts of from about 1 to 20 percent by weight of the beta-haloethylbenzene initially used.

The alkylation reaction can be carried out at temperatures between −80° and 35° C., preferably from −20° to 30° C., and at atmospheric or substantially atmospheric pressure, and in any suitable reaction vessel such as a reaction vessel made of polytetrafluoroethylene or polyethylene or an iron or steel vessel lined with such polymeric material.

In practice, a charge of the beta-haloethylbenzene to be alkylated is placed in a suitable reaction vessel, together with the titanium tetrachloride in the desired proportion. The mixture is stirred and maintained at a desired temperature while introducing anhydrous or substantially anhydrous hydrogen fluoride into the liquid in the desired amount. Usually the addition of the hydrogen fluoride results in the formation of a yellow or yellow brown colored complex layer or dispersion. Thereafter, the olefin is added, preferably at about the rate it is consumed in the reaction while maintaining the resulting mixture within the temperature range herein specified until the desired amount of the olefin has been added. The product can be recovered in usual ways such as by pouring the reaction mixture onto crushed ice or mixing it with cold water to decompose the catalyst, then separating and washing the organic layer with water or an aqueous solution such as an aqueous 5 weight percent solution of sodium carbonate or sodium hydroxide. The organic layer is usually dried, then distilled to separate and recover the beta-haloethyl alkylbenzene product.

The following examples illustrate ways in which the principle of the invention has been applied, but are not to be construed as limiting its scope.

Example 1

A charge of 226 grams (1.23 moles) of beta-bromo-ethylbenzene, together with 6.7 grams of titanium tetrafluoride ($TiF_4$) was placed in a reaction vessel made of polytetrafluoroethylene and equipped with a reflux condenser and stirrer. The mixture was stirred and maintained at about 4° C. by cooling the reaction vessel in a bath of ice and water. A charge of 20 grams of hydrogen fluoride was bubbled into the liquid. A yellow-brown colored complex layer was formed. Isobutylene was bubbled into the liquid over a period of one hour while stirring and maintaining the mixture at temperatures between 5° and 10° C. until a total of about 41.5 grams (0.74 mole) of isobutylene was added. The reaction mixture was poured onto crushed ice and the organic layer was washed with water and was separated and dried with anhydrous calcium chloride. The dried organic layer was distilled. There was obtained 110 grams (0.6 mole) of unreacted beta-bromo-ethylbenzene boiling at 98° C. at 14 millimeters absolute pressure, 128 grams (0.53 mole) of beta-bromoethyl tert.-butylbenzene boiling at 120° C.–135° C. at 11 millimeters, and 16 grams of higher boiling residue. The yield of beta-bromoethyl tert.-butylbenzene was 84 percent based on the beta-bromoethylbenzene consumed in the reaction.

Example 2

A charge of 140.5 grams (1 mole) of beta-chloroethylbenzene, together with 5 grams of titanium tetrafluoride, was placed in a reaction vessel made of polyethylene and equipped with a reflux condenser and stirrer, and 19 grams of anhydrous hydrogen fluoride was added. Isobutylene was added and reacted with the beta-chloroethylbenzene employing procedure similar to that employed in Example 1. The organic layer was dried and distilled. There was obtained 46 grams of unreacted beta-chloroethylbenzene boiling at 60–85° C. at 5 millimeters absolute pressure, 125 grams of beta-chloroethyl tert.-butylbenzene boiling at 97–102° C. at 4 millimeters and 9 grams of higher boiling residue. The conversion was 67 percent. The yield of beta-chloroethyl tert.-butylbenzene was 94.5 percent based on the beta-chloroethylbenzene consumed in the reaction.

Example 3

A charge of 62 grams (0.5 mole) of beta-fluoroethylbenzene, together with 3 grams of titanium tetrafluoride was placed in a reaction vessel made of polytetrafluoroethylene and equipped with a reflux condenser and stirrer. The mixture was stirred and cooled to a temperature of about 4° C. and 10 grams of anhydrous hydrogen fluoride was added. Thereafter, isobutylene was bubbled into the liquid for a period of 0.5 hour while stirring and maintaining it at temperatures between 5° and 10° C. The reaction mixture was poured onto crushed ice and the organic layer was washed with water and separated. It was dried with anhydrous sodium sulfate and was distilled. There was obtained 23 grams of unreacted beta-fluoroethylbenzene boiling at 52–58° C. at 6 millimeters absolute pressure, 28 grams of beta-fluoroethyl tert.-butylbenzene boiling at 82–86° C. at 4 millimeters and 25 grams of higher boiling residue. The conversion was 63 percent. The yield of beta-fluoroethyl tert.-butylbenzene was 49.5 percent based on the beta-fluoroethylbenzene consumed in the reaction.

Example 4

In each of a series of experiments, a charge of one gram molecular proportion of a beta-haloethylbenzene as identified in the following table was reacted with 0.33 gram mole of an olefin as stated in the table while in contact with a catalyst mixture consisting of 5 grams of titanium tetrafluoride and 10 grams (0.5 mole) of hydrogen fluoride employing procedure similar to that described in Example 1. The product was separated and recovered by procedure similar to that employed in said example. The table identifies the experiments, names the beta-haloethylbenzene and the olefin employed in the reaction, and gives the reaction conditions of time and temperature. The table names the beta-haloethyl alkyl benzene product, gives its boiling range and the percent yield of said product, based on the weight of the beta-haloethylbenzene starting material consumed in the reaction.

TABLE

| Run No. | Starting Materials | | | | Reaction Conditions | | Product | | |
|---|---|---|---|---|---|---|---|---|---|
| | β-Haloethylbenzene | | Olefin | | Temp., °C. | Time, Hrs. | | | |
| | Kind | gm. mole | Kind | gm. mole | | | Kind | B.P., °C mm. | Yield, Percent |
| 1 | β-chloroethylbenzene | 1 | ethylene | 0.33 | 10 | 2 | β-chloroethyl ethylbenzene | 80–81/5 | 53 |
| 2 | do | 1 | propylene | 0.33 | 5 | 1.5 | β-chloroethyl isopropylbenzene | 89–91/5 | 72 |
| 3 | do | 1 | isobutylene | 0.33 | 10 | 2 | β-chloroethyl tert.-butyl benzene | 97–102/4 | 67 |
| 4 | β-bromoethylbenzene | 1 | ethylene | 0.33 | 0 | 2 | β-bromoethyl ethyl benzene | 92–93/4 | 58 |
| 5 | do | 1 | propylene | 0.33 | 15 | 1 | β-bromoethyl isopropylbenzene | 101–102/5 | 71 |
| 6 | do | 1 | isobutylene | 0.33 | 5 | 1 | β-bromoethyl tert.-butyl benzene | 117–119/5 | 84 |
| 7 | β-fluoroethylbenzene | 1 | propylene | 0.33 | 0 | 1.5 | β-fluoroethyl isopropyl benzene | 78–79/4 | 63 |
| 8 | do | 1 | isobutylene | 0.33 | 0 | 1.5 | β-fluoroethyl tert.-butyl benzene | 84–85/4 | 70 |

We claim:
1. A method for making a beta-haloalkyl alkaryl compound which comprises contacting a beta-haloalkyl aromatic compound having at least one replaceable hydrogen atom on a carbon atom of the aromatic nucleus with a monoethylenically unsaturated olefin having a double bond between vicinal carbon atoms in an aliphatic radical while in admixture with from 1 to 20 percent by weight, based on the weight of the beta-haloalkyl aromatic compound, of an alkylating catalyst comprising hydrogen fluoride and titanium tetrafluoride in proportions corresponding to from 0.5 to 20 gram molecular proportions of the hydrogen fluoride per gram mole of the titanium tetrafluoride at temperatures between −80° C. and 35° C.

2. A method according to claim 1, wherein the beta-haloalkyl aromatic compound is a beta-haloethylbenzene.

3. A method according to claim 1, wherein the monoethylenically unsaturated olefin is an aliphatic olefin containing from 2 to 12 carbon atoms in the molecule.

4. A method according to claim 1, wherein the beta-haloalkyl aromatic compound is beta-chloroethylbenzene and the monoethylenically unsaturated olefin is ethylene.

5. A method according to claim 1, wherein the beta-haloalkyl aromatic compound is beta-chloroethylbenzene and the monoethylenically unsaturated olefin is propylene.

6. A method according to claim 1, wherein the beta-haloalkyl aromatic compound is beta-chloroethylbenzene and the monoethylenically unsaturated olefin is isobutylene.

7. A method according to claim 1, wherein the beta-haloalkyl aromatic compound is beta-bromoethylbenzene and the monoethylenically unsaturated olefin is ethylene.

8. A method according to claim 1, wherein the beta-haloalkyl aromatic compound is beta-bromoethylbenzene and the monoethylenically unsaturated olefin is propylene.

9. A method according to claim 1, wherein the beta-haloalkyl aromatic compound is beta-fluoroethylbenzene and the monoethylenically unsaturated olefin is propylene.

10. A method for making a beta-fluoroethyl alkylbenzene which comprises contacting beta-fluoroethylbenzene with isobutylene while in admixture with from 1 to 20 percent by weight, based on the weight of the beta-fluoroethylbenzene, of an alkylating catalyst comprising hydrogen fluoride and titanium tetrafluoride in proportions corresponding to from 1 to 20 gram molecular proportions of the hydrogen fluoride per gram mole of the titanium tetrafluoride at temperatures between −80° C. and 35° C., and separating beta-fluoroethyl tert.-butylbenzene from the reacted mixture.

References Cited in the file of this patent

UNITED STATES PATENTS

| | | |
|---|---|---|
| 2,275,312 | Tinker et al. | Mar. 3, 1942 |
| 2,683,760 | McCauley et al. | July 13, 1954 |
| 2,889,377 | Floria | June 2, 1959 |
| 2,998,460 | Olah et al. | Aug. 29, 1961 |